(12) United States Patent
Ablabutyan et al.

(10) Patent No.: US 7,632,058 B2
(45) Date of Patent: Dec. 15, 2009

(54) WHEELCHAIR LIFT AND METHOD FOR OPERATING THE SAME

(75) Inventors: Karapet Ablabutyan, Glendale, CA (US); Parkev Krmoian, Glendale, CA (US)

(73) Assignee: Maxon Lift Corporation, Santa Fe Springs, CA (US)

( * ) Notice: Subject to any disclaimer, the term of this patent is extended or adjusted under 35 U.S.C. 154(b) by 0 days.

(21) Appl. No.: 12/105,239

(22) Filed: Apr. 17, 2008
(Under 37 CFR 1.47)

(65) Prior Publication Data
US 2009/0000876 A1     Jan. 1, 2009

Related U.S. Application Data

(60) Division of application No. 11/387,094, filed on Mar. 21, 2006, now abandoned, which is a continuation-in-part of application No. 10/954,697, filed on Sep. 29, 2004, now abandoned, which is a continuation-in-part of application No. 10/251,433, filed on Sep. 20, 2002, now Pat. No. 6,705,824, which is a continuation of application No. 09/675,318, filed on Sep. 29, 2000, now Pat. No. 6,461,097.

(51) Int. Cl.
| | |
|---|---|
| *B65F 9/00* | (2006.01) |
| *B65F 1/00* | (2006.01) |
| *B60P 1/00* | (2006.01) |
| *G05D 3/00* | (2006.01) |
| *E05F 15/00* | (2006.01) |
| *G01L 3/00* | (2006.01) |

(52) U.S. Cl. ............ 414/809; 414/546; 701/46; 702/42

(58) Field of Classification Search ............ 414/539, 414/540, 546, 547; 701/40, 46; 702/41, 702/44, 91
See application file for complete search history.

(56) References Cited

U.S. PATENT DOCUMENTS

| | | | | |
|---|---|---|---|---|
| 3,612,966 | A * | 10/1971 | Dybel | 361/170 |
| 3,917,930 | A * | 11/1975 | Davey et al. | 318/561 |
| 4,535,405 | A * | 8/1985 | Hill et al. | 700/90 |
| 4,942,529 | A * | 7/1990 | Avitan et al. | 701/50 |
| 5,110,251 | A * | 5/1992 | Gray | 414/545 |
| 6,461,097 | B1 * | 10/2002 | Ablabutyan et al. | 414/546 |
| 6,705,824 | B2 * | 3/2004 | Ablabutyan et al. | 414/546 |
| 2002/0087233 | A1 * | 7/2002 | Raab | 700/262 |
| 2002/0110248 | A1 * | 8/2002 | Kovales et al. | 381/56 |
| 2003/0046526 | A1 * | 3/2003 | Zhang et al. | 713/1 |
| 2004/0035343 | A1 * | 2/2004 | Floe et al. | 114/51 |
| 2005/0238471 | A1 * | 10/2005 | Ablabutyan et al. | 414/546 |
| 2007/0224025 | A1 * | 9/2007 | Ablabutyan et al. | 414/546 |

* cited by examiner

*Primary Examiner*—Gregory W Adams
(74) *Attorney, Agent, or Firm*—Tutunjian & Bitetto, P.C.

(57) ABSTRACT

A wheelchair lift having a logic module which provides several interlocks that promote proper operation is described. The logic module may be programmed to enable efficient user interface and to compensate for variations in lift operation parameters. In one embodiment, the wheelchair lift has an arm geometry which requires a lower peak force for operation.

13 Claims, 13 Drawing Sheets

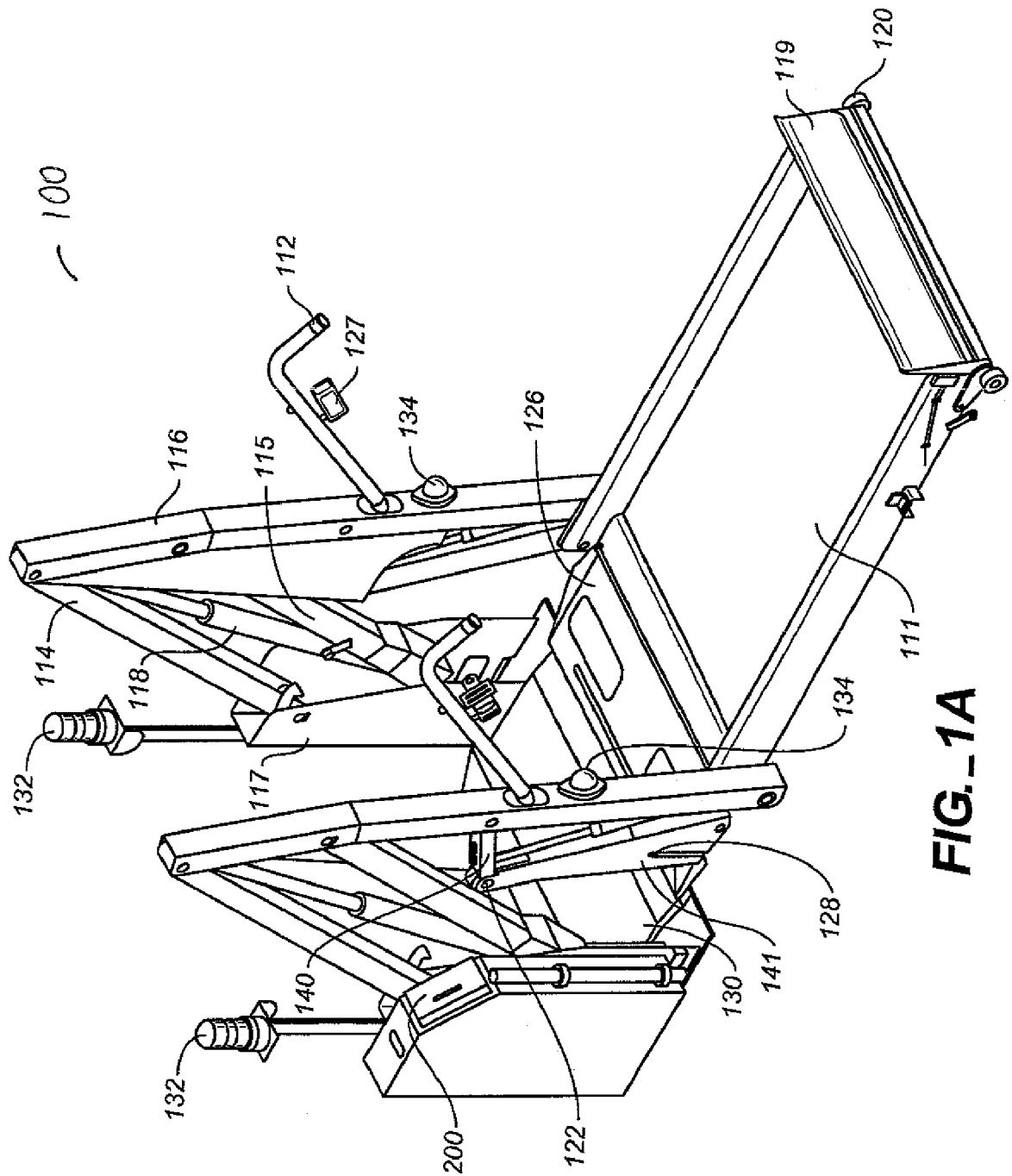
FIG._1A

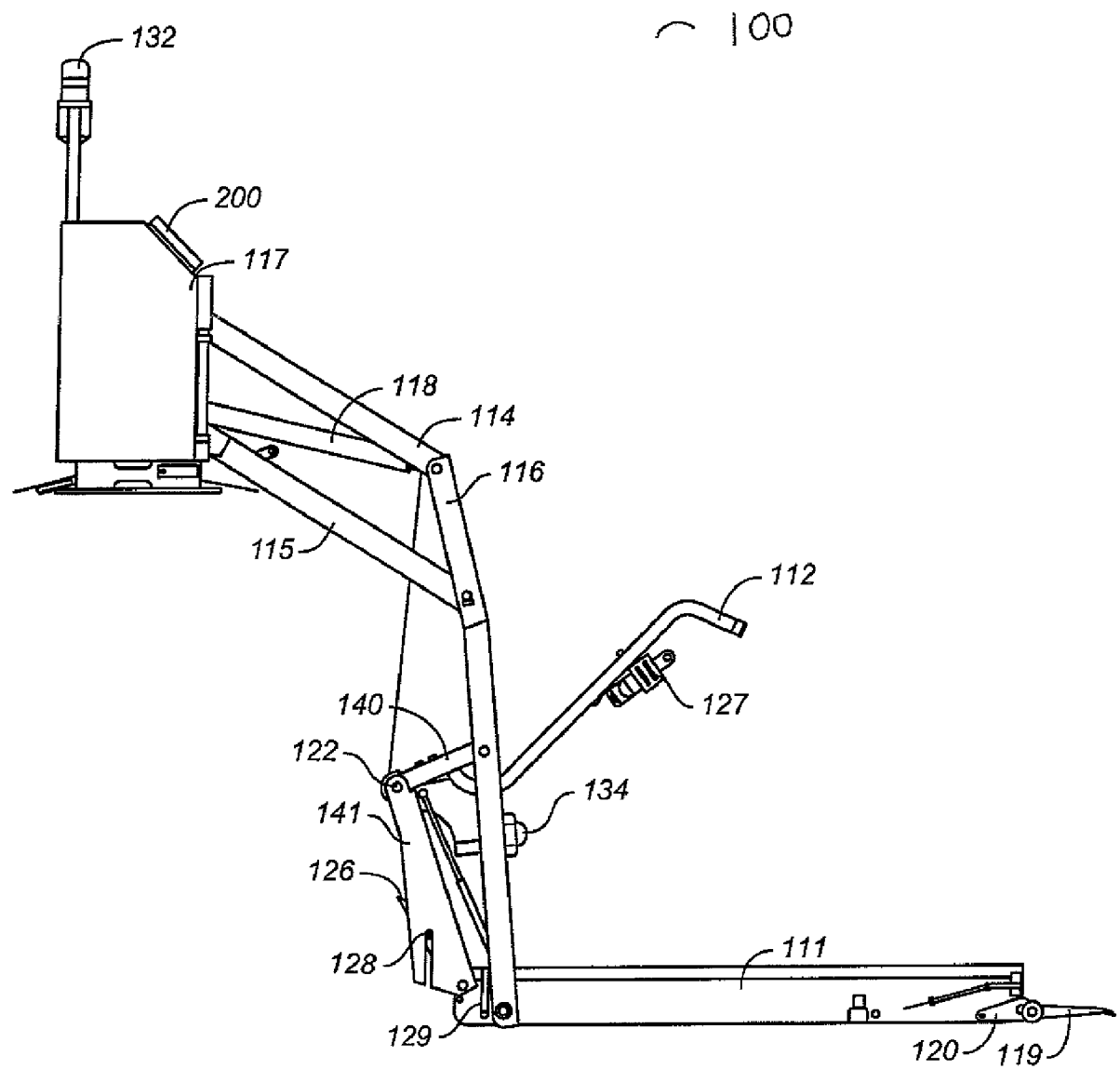
FIG._1B

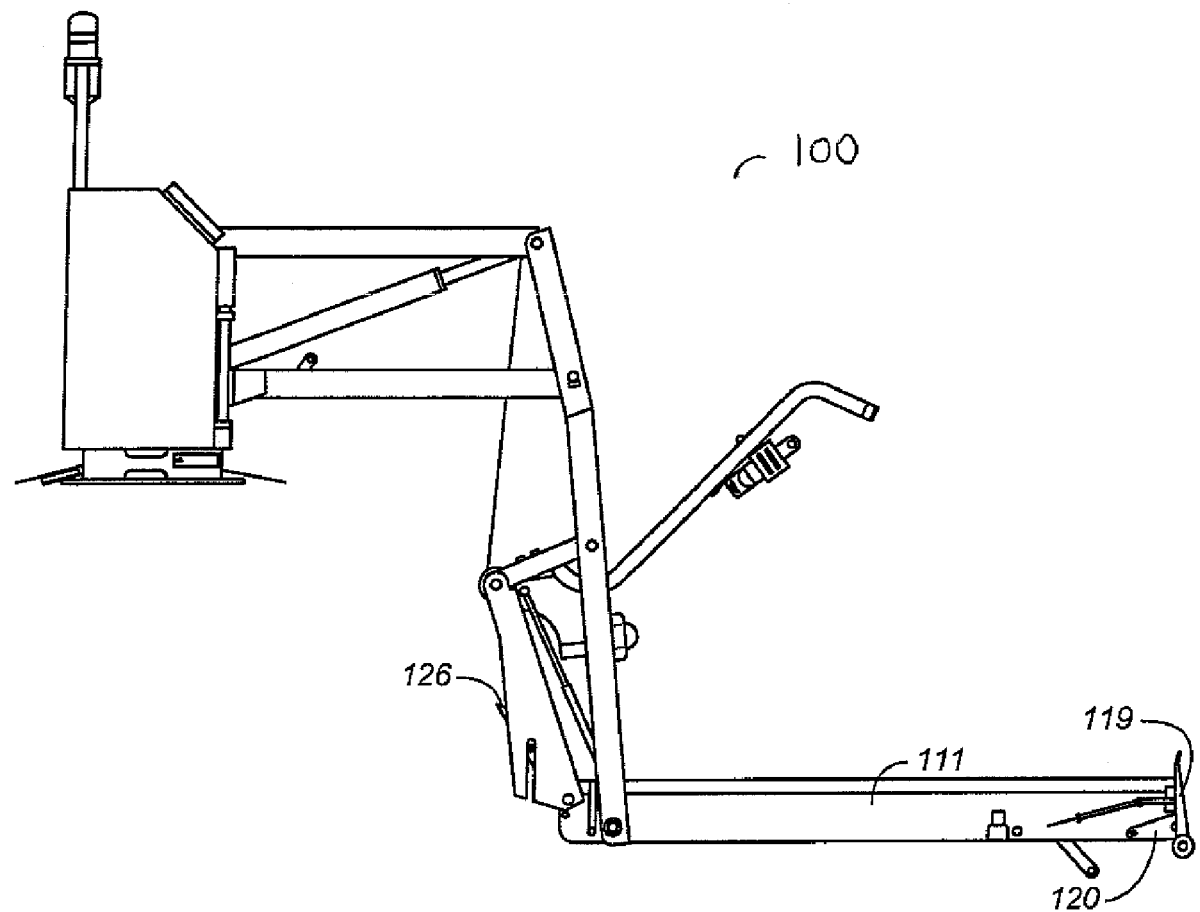
FIG._1C

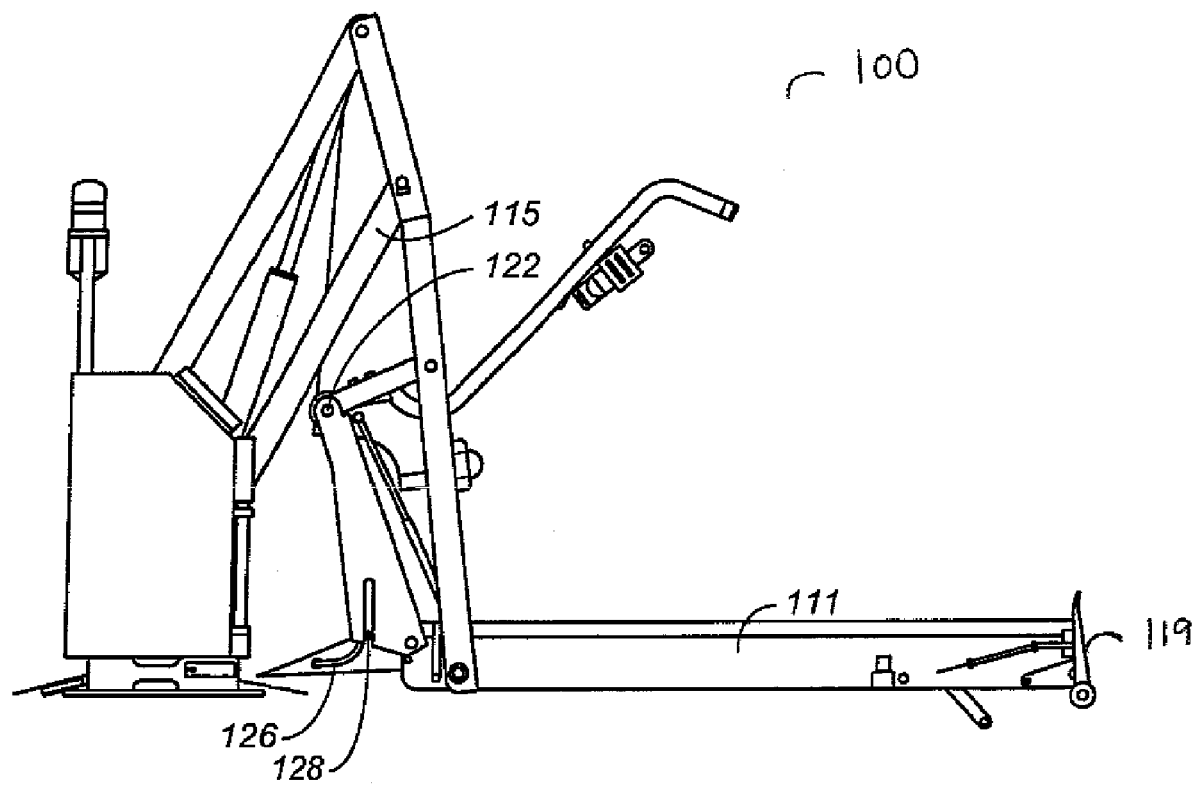
FIG._1D

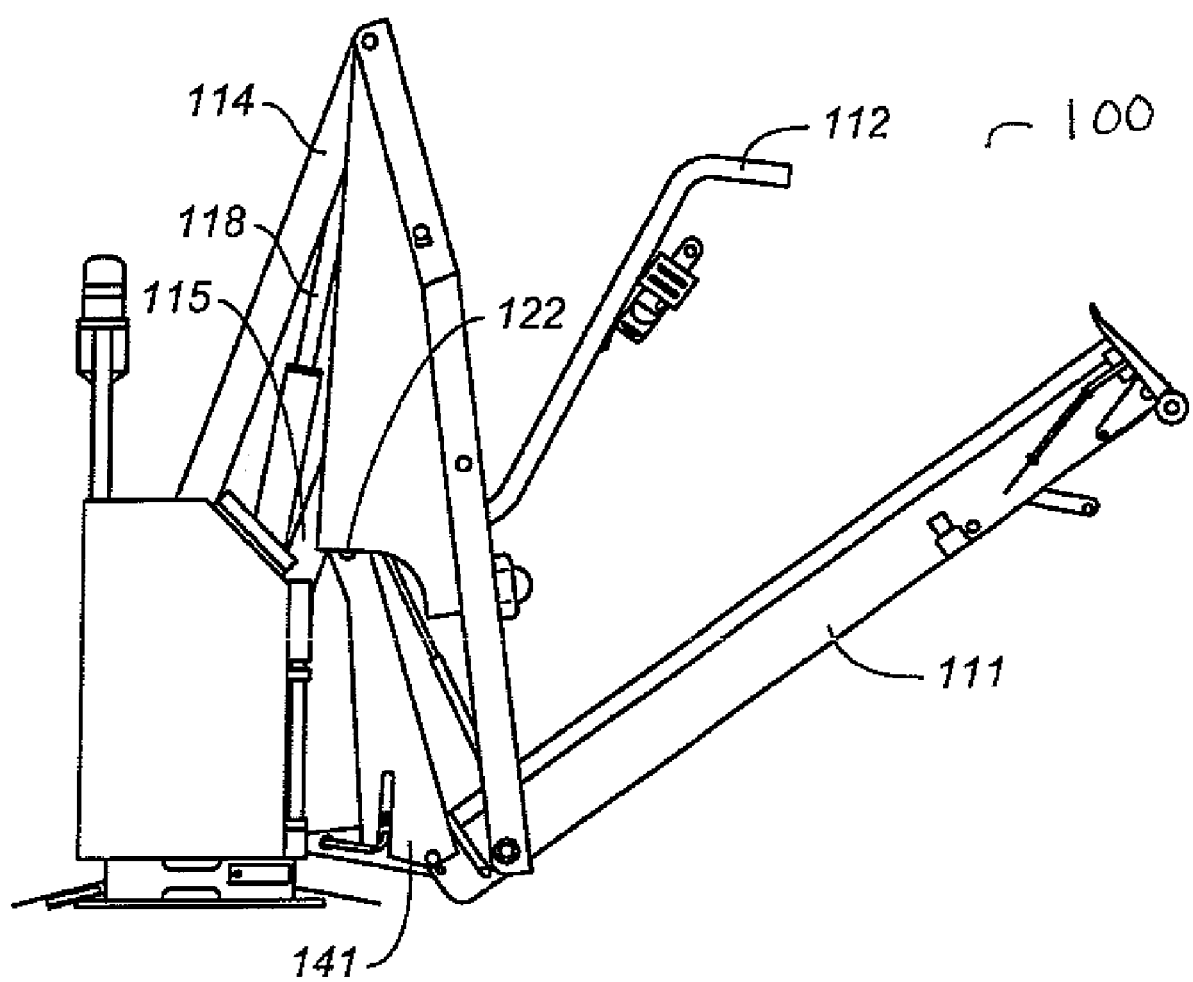
FIG._1E

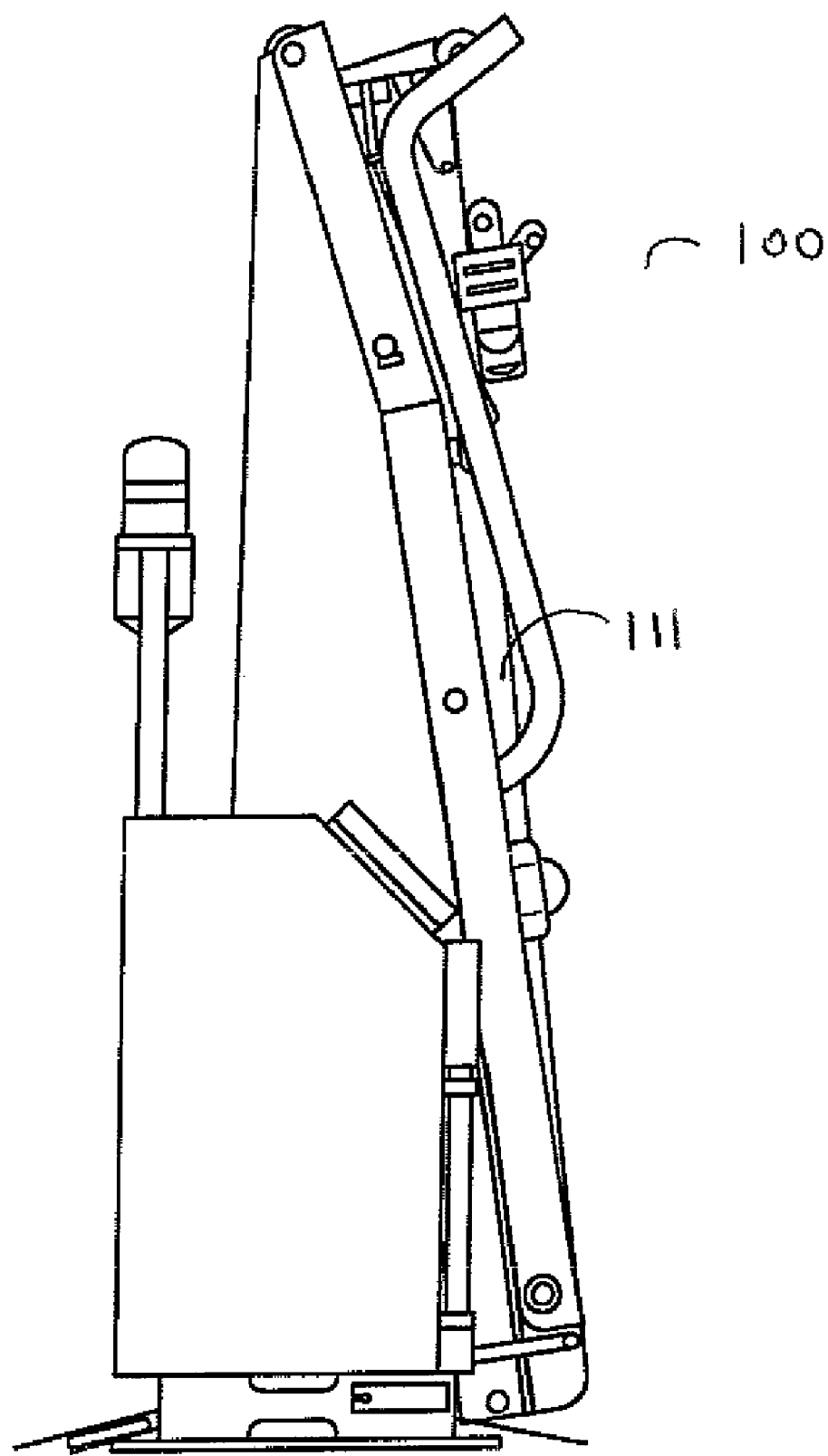
FIG._1F

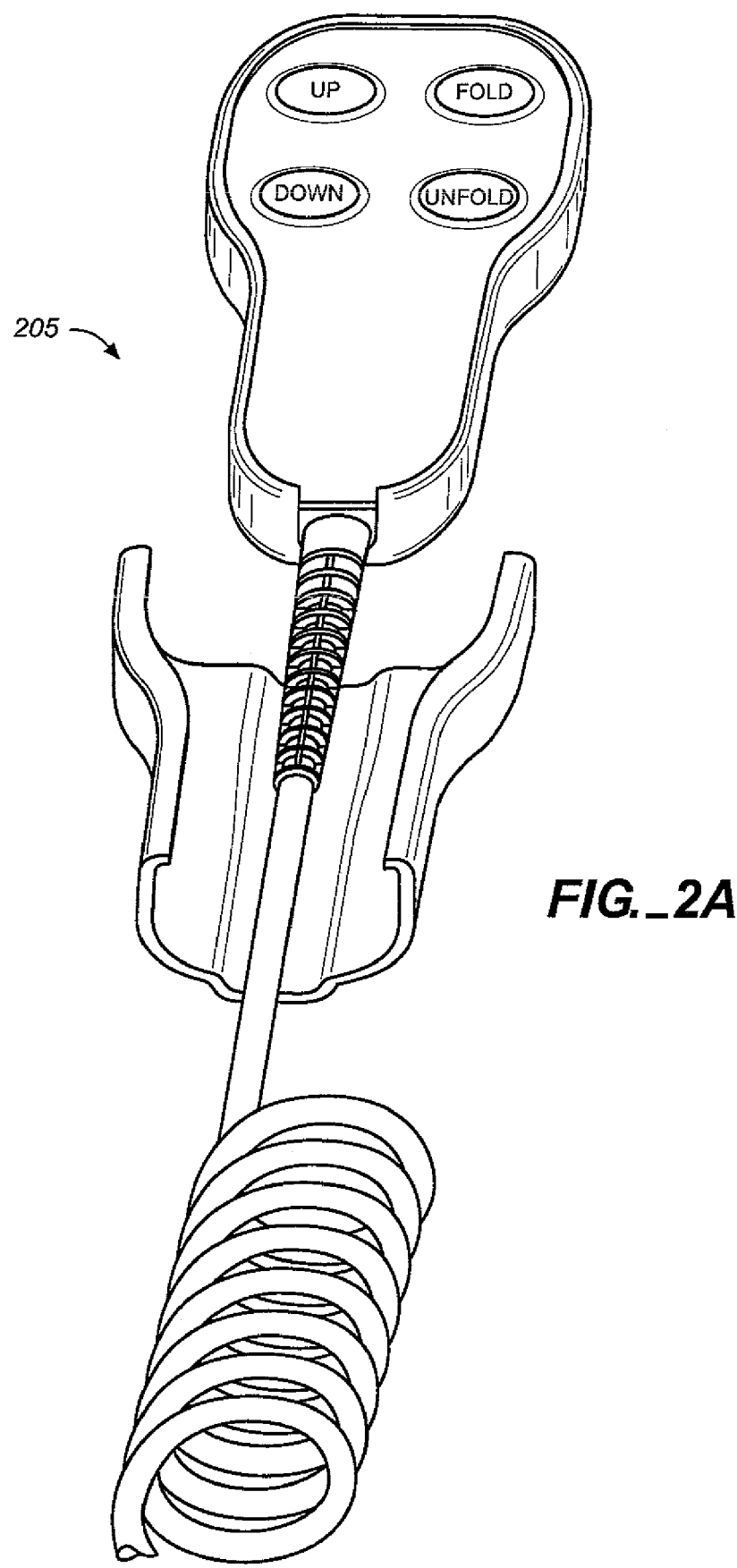
FIG._2A

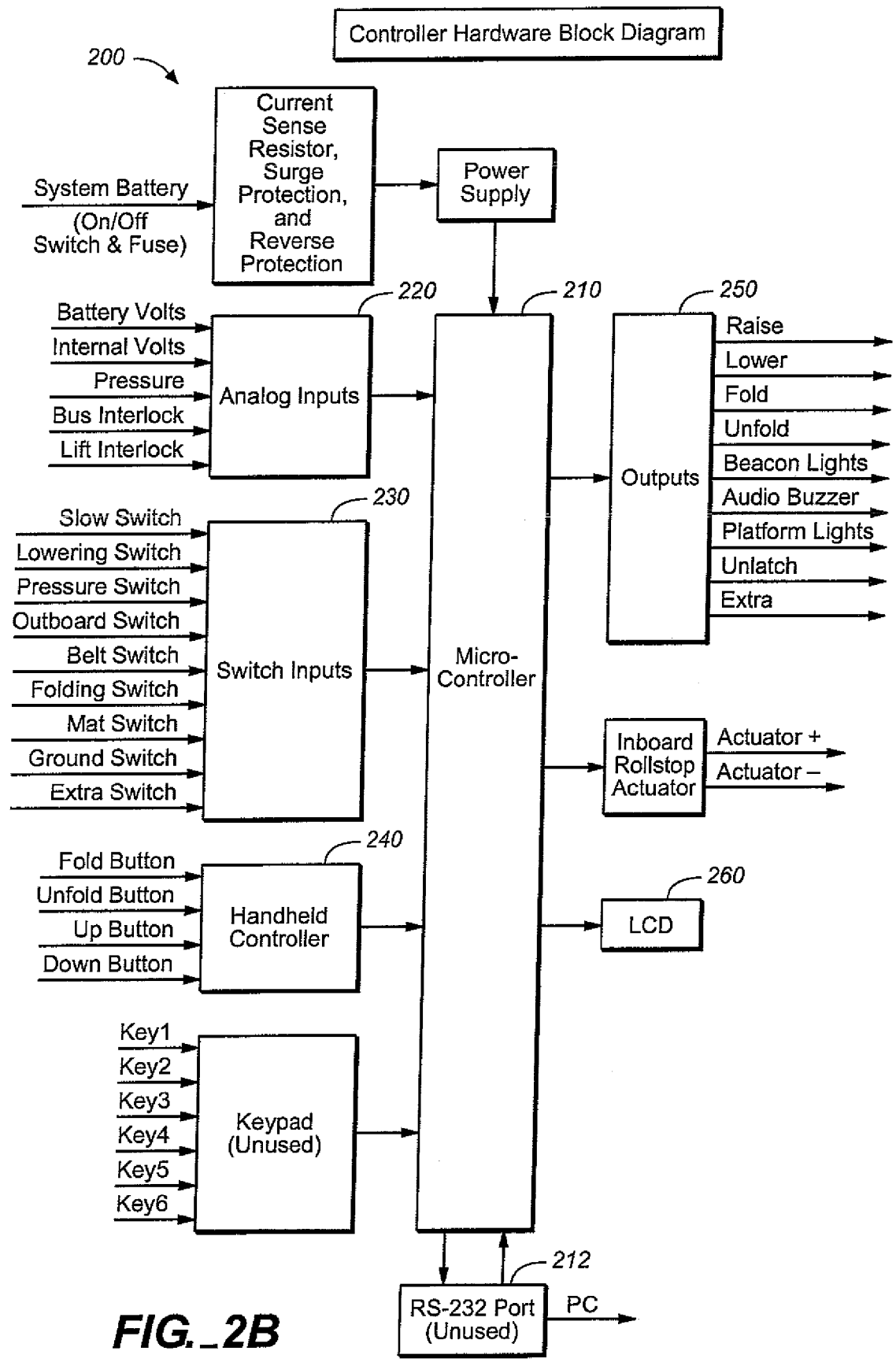
FIG._2B

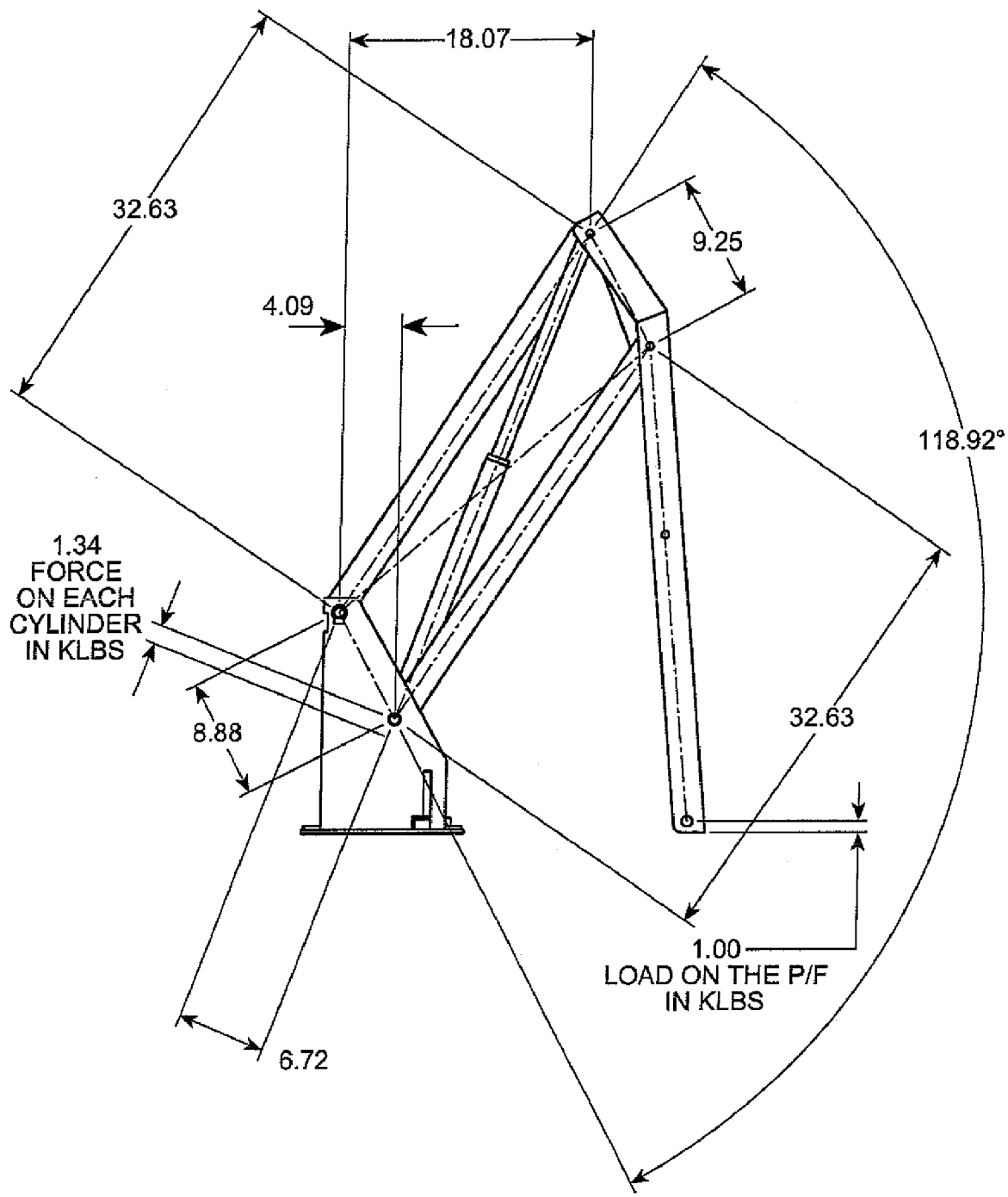
FIG._3A
*(PRIOR ART)*

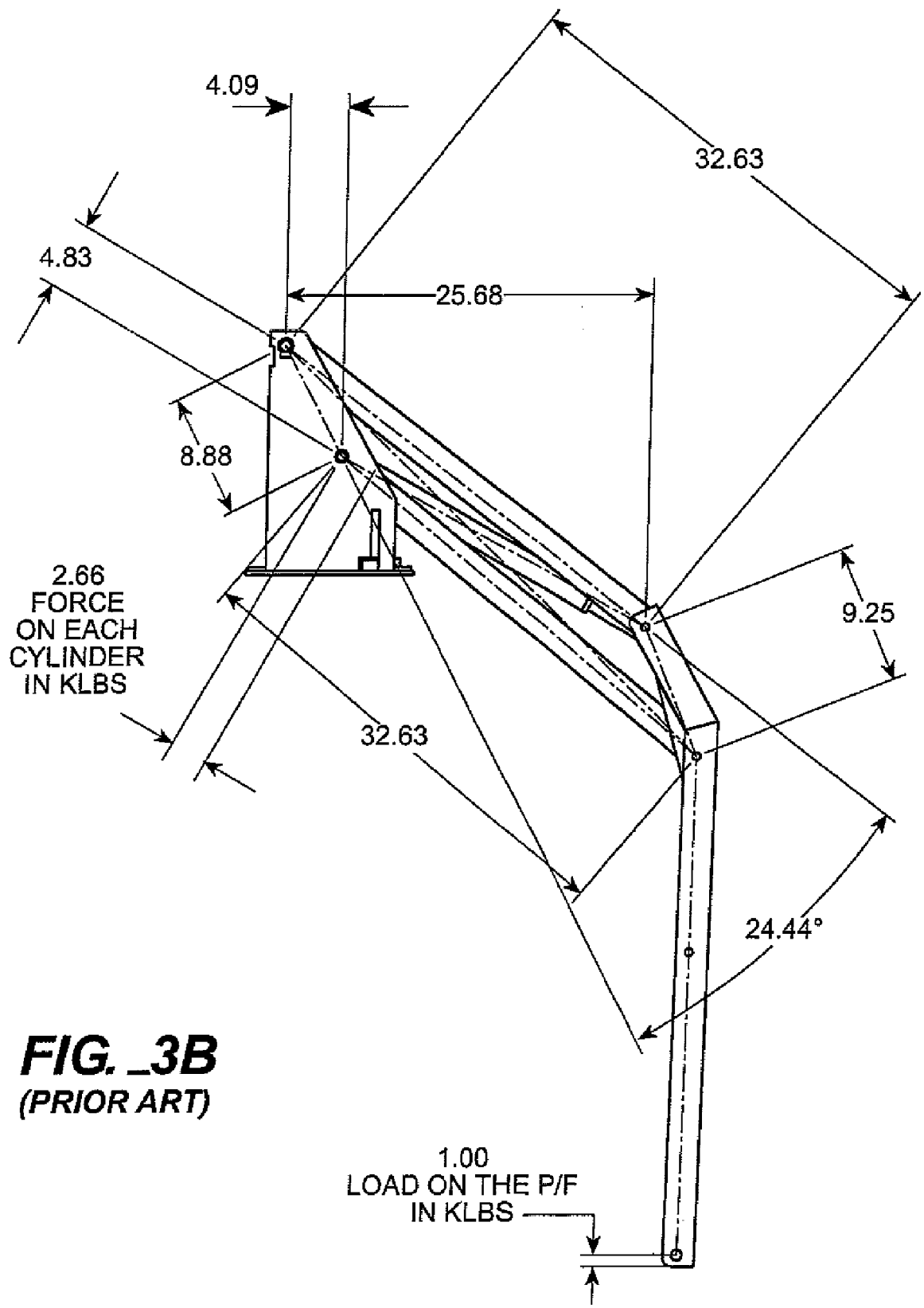
FIG._3B
(PRIOR ART)

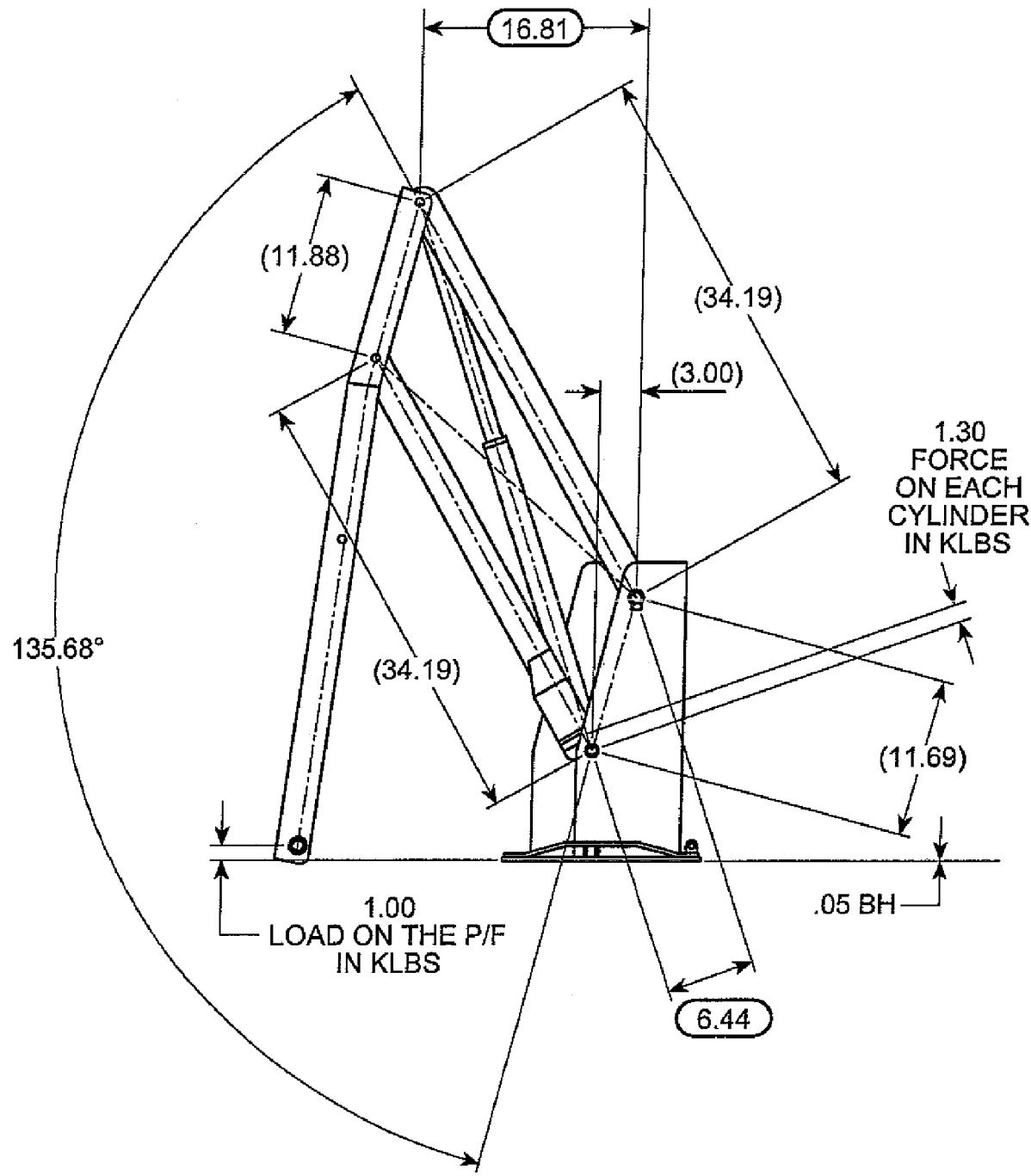
FIG._3C

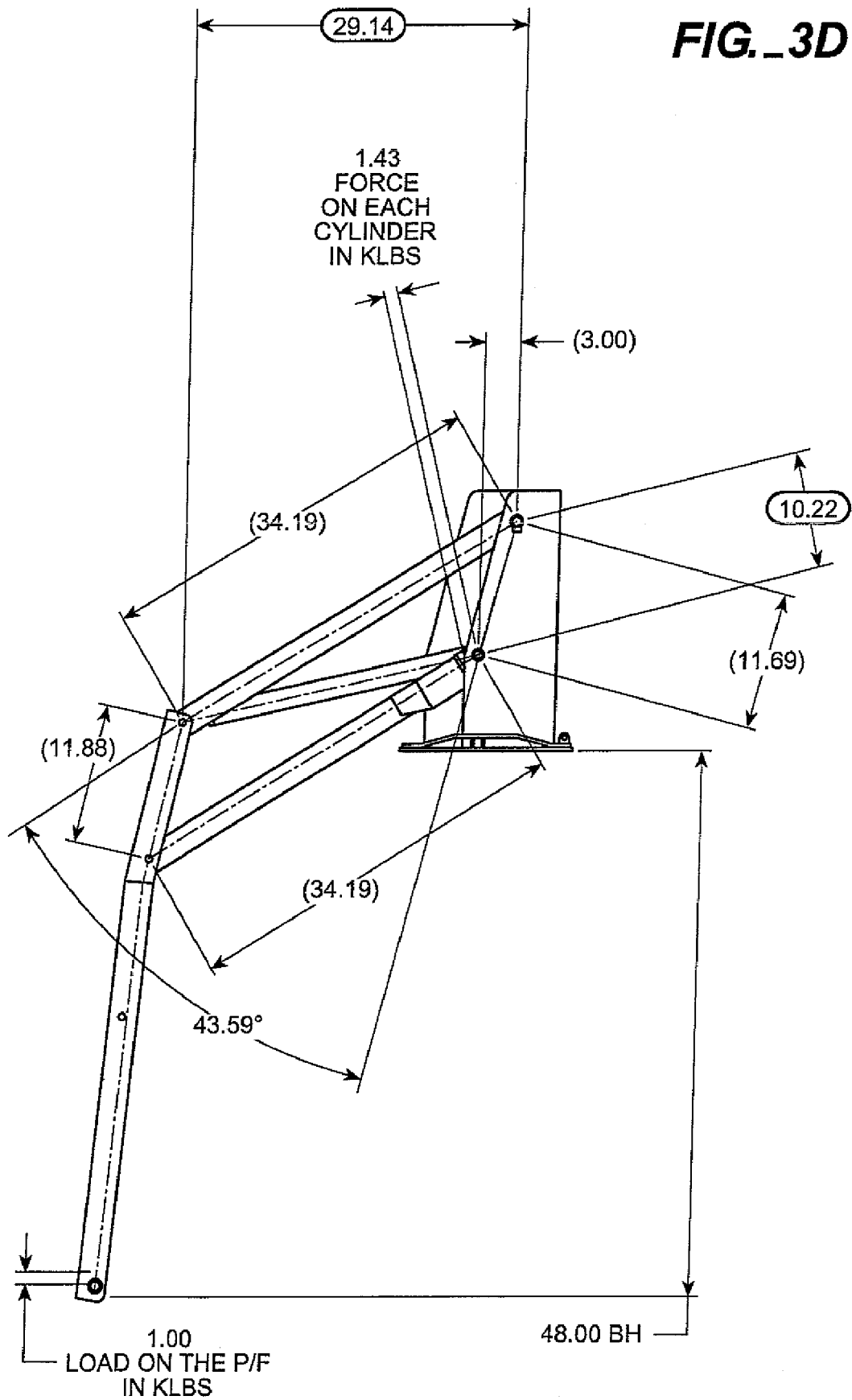
FIG._3D

WHEELCHAIR LIFT AND METHOD FOR OPERATING THE SAME

CROSS-REFERENCE TO RELATED APPLICATIONS

This application is divisional application of U.S. patent application Ser. No. 11/387,094, filed Mar. 21, 2006, which is a continuation-in-part of U.S. patent application Ser. No. 10/954,697, filed Sep. 29, 2004, entitled "Wheelchair Lift", which is a continuation-in-part of U.S. patent application Ser. No. 10/251,433 filed Sep. 20, 2002, entitled "Wheelchair Lift Device", now U.S. Pat. No. 6,705,824, which is a continuation of U.S. patent application Ser. No. 09/675,318 filed on Sep. 29, 2000, entitled "Wheelchair Lift Device", now U.S. Pat. No. 6,461,097, each of which is incorporated by reference herein.

BACKGROUND

1. Field of the Invention

The present invention is directed to a wheelchair lift. More specifically, the present invention is directed to a wheelchair lift with interlocks that promote proper operation. The present invention is also directed towards a wheelchair lift which requires a lower peak force for operation.

2. State of the Art

Wheelchair lifts raise and lower a wheelchair and/or passenger to and from vehicles. Wheelchair lifts are typically mounted in a doorway of a vehicle with a lift mechanism and have a platform that raises and lowers the wheelchair and/or passenger between the ground and the vehicle. A common wheelchair lift design uses a mounting structure comprising a parallelogram design having two sets of lift arms arranged in a parallelogram or near-parallelogram arrangement on either side of the platform. Other designs may include mounting structures having sliding arrangements such as where the platform is horizontally stowed adjacent to the vehicle bed and slid-out to a raising and lowering position.

Wheelchair lifts may use hydraulic actuators to provide the lifting force to move the platform. In certain situations, the use of electric actuators may provide certain features which are desirable to wheelchair lifts. For example, electric actuators may provide variable speed control. However, an electric actuator of a given force rating will cost more than a hydraulic actuator of the same force rating.

What is needed is a wheelchair lift with interlocks that promote proper operation. What is also needed is a wheelchair lift which requires a lower peak force for operation, to permit the practical use of electric actuators.

SUMMARY

The present invention overcomes the problems of the prior art by providing a wheelchair lift having a logic module that provides several interlocks to promote proper and safe operation. The logic module may also be programmed to enable efficient user interface and to compensate for variations in lift operation parameters.

Other and further features and advantages of the present invention will be apparent from the following descriptions of the various embodiments when read in conjunction with the accompanying drawings. It will be understood by one of ordinary skill in the art that the following embodiments are provided for illustrative and exemplary purposes only, and that numerous combinations of the elements of the various embodiments of the present invention are possible.

BRIEF DESCRIPTION OF THE SEVERAL VIEWS OF THE DRAWINGS

In the drawings, which illustrate what is currently considered to be a preferred embodiment for carrying out the invention:

FIG. 1A shows one embodiment of a wheelchair lift in accordance with the present invention.

FIG. 1B-1F show the wheelchair lift in a ground, intermediate, floor level, partially stowed, and fully stowed positions.

FIG. 2A shows one embodiment of a remote control pendant that may be used with the wheelchair lift.

FIG. 2B shows a block diagram of controller features according to one embodiment of the present invention.

FIGS. 3A-3B show a prior art arm geometry for a wheelchair lift.

FIGS. 3C-3D show one embodiment of an arm geometry in accordance with the present invention.

DETAILED DESCRIPTION OF EMBODIMENTS

Figure 3E:
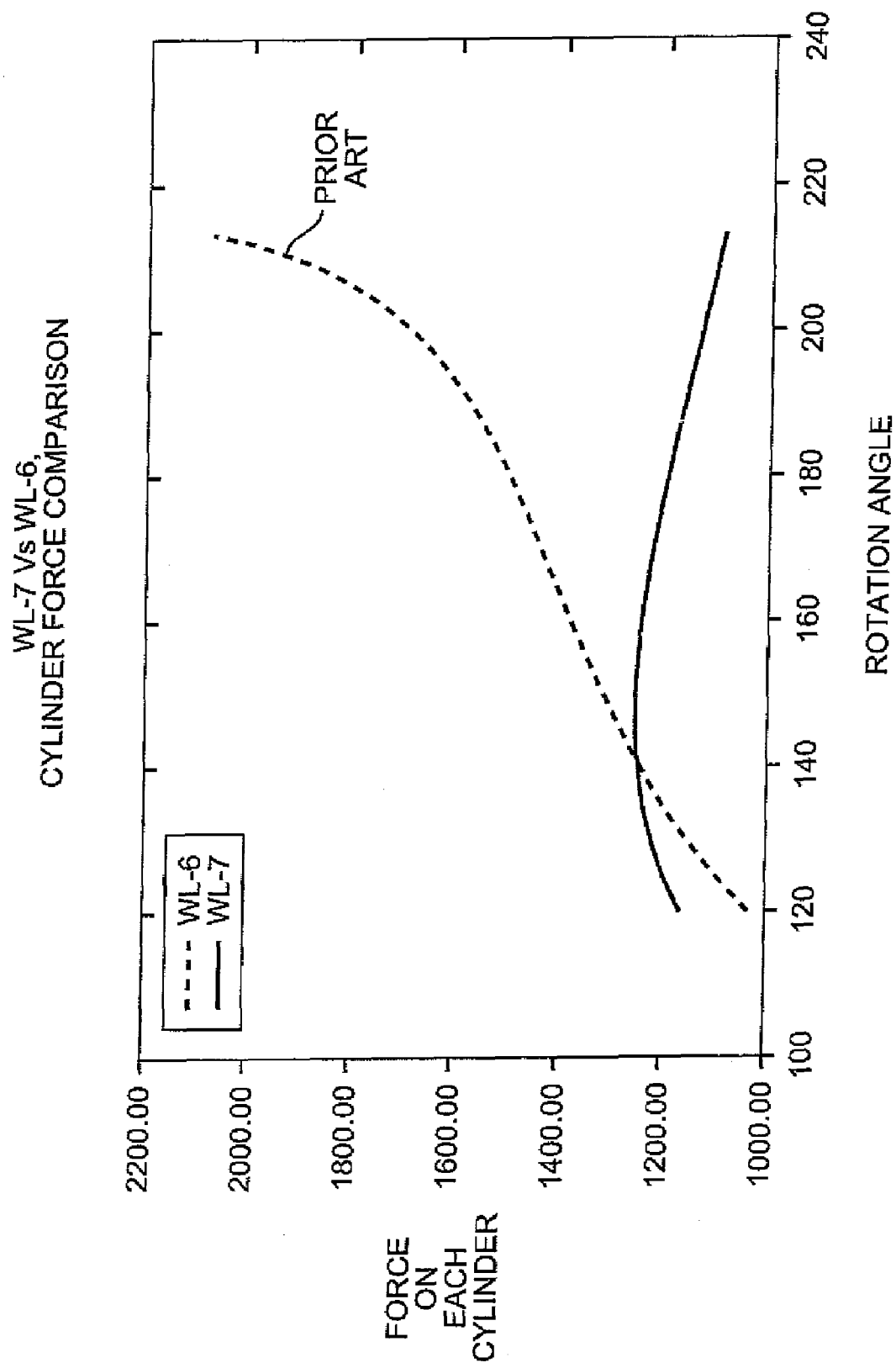
FIG. 3E shows a graph of actuator force required for a prior art arm geometry and an arm geometry in accordance with the present invention.

FIG. 1A shows one embodiment of a wheelchair lift 100 in accordance with the present invention. Wheelchair lift 100 includes a mounting structure comprising an upper arm 114 and a lower arm 115 coupled to a frame 117 and a vertical arm 116. The points where upper arm 114 and lower arm 115 couple to frame 117 and vertical arm 116 may form the points of a parallelogram or a near-parallelogram. A lift actuator 118 is coupled to the point where upper arm 114 couples to vertical arm 116 and to the point where lower arm 115 couples to frame 117. Frame 117 is designed to be coupled to a vehicle, and may include a threshold plate 130.

Wheelchair lift 100 also includes a platform 111 coupled to vertical arm 116. Platform 111 is kept in a substantially level position by a platform stop 129 (FIG. 1B) which rests against vertical arm 116. An inboard roll stop 126 and an outboard roll stop 119 are coupled to platform 111. A stow linkage is also coupled to platform 111, the stow linkage having an upper stow arm 140, a lower stow arm 141, and a roller 122. An inboard roll stop actuator 128 is coupled to inboard roll stop 126 and lower stow arm 141. A handrail 112 is coupled to upper section 141 of the stow linkage. A restraint belt 127 is attached to handrail 112. An outboard roll stop linkage 120 is coupled to outboard roll stop 119.

A logic module 200 provides several interlocks that promote the proper operation of wheelchair lift 100. Logic module 200 is described in greater detail below. A visual alarm 132 provides a visual alert when wheelchair lift 100 is in use, and/or when a specific event occurs such as a mechanical or safety related condition preventing operation of wheelchair lift 100 (e.g., weight is detected on threshold plate 130). In a preferred embodiment, two visual alarms 132 are coupled to frame 117, or otherwise coupled directly to wheelchair lift 100. Audio alarms such as a siren or buzzer may also be included to provide audible alerts that wheelchair lift 100 is in use, or if there is a condition preventing wheelchair lift 100 from being operated.

In another embodiment, audio alarms may be in the form of voice notifications or commands, which may be used to notify a lift operator or passenger of a specific condition or to give instruction to take a responsive action. Such voice-based alarms may be especially desirable, by way of example, when the operator's view of a portion of the lift is obstructed, or when a passenger is sight impaired and requires verbal notifications to be aware of lift events. Non-limiting examples of specific verbal alarms may include notifying a passenger when to enter and exit the platform, that it is safe for the operator to proceed with raising or lowering the lift, or that some specific part of the lift requires attention before operation may take place.

A platform light 134 attached to vertical arm 116 illuminates platform 111 when wheelchair lift 100 is used in poor light conditions. In a preferred embodiment, two platform lights 134 are connected to each vertical arm 116, or otherwise coupled directly to wheelchair lift 100.

FIG. 1B shows wheelchair lift 100 in a ground position. Platform 111 is near or at ground level. Outboard roll stop 119 is lowered when outboard roll stop linkage 120 contacts the ground, thus allowing the passenger to board platform 111. Inboard roll stop 126 is raised and prevents the passenger from traveling off platform 111.

FIG. 1C shows wheelchair lift 100 in an intermediate position after it has begun to lift from the ground position. Outboard roll stop 119 is raised as outboard roll stop linkage 120 lifts off the ground and no longer contacts the ground, thus preventing the passenger from traveling off platform 111. Inboard roll stop 126 is still raised.

FIG. 1D shows wheelchair lift 100 in a floor level position. Platform 111 is at the level of the vehicle. Inboard roll stop actuator 128 lowers inboard roll stop 126 and allows the passenger to board the vehicle. Outboard roll stop 119 is still raised.

FIG. 1E shows wheelchair lift 100 as it is folding into a stowed position. Lift actuator 118 continues to raise upper arm 114 and lower arm 115. After platform 111 lifts a small distance, roller 122 begins to push against lower arm 115, and upper stow arm 140 (see FIG. 1A) and lower stow arm 141 straighten out and begin to raise platform 111 into a stowed position. Handrails 112 also begin to raise into a stowed position.

FIG. 1F shows wheelchair lift 100 in the fully stowed position. Platform 111 is now in an upright position. Hooks or latches may prevent platform 111 from shaking or rattling while in the stowed position.

As mentioned above, logic module 200 provides several interlocks that promote the proper operation of wheelchair lift 100. Logic module 200 is capable of receiving feedback from various sensors located throughout wheelchair lift 100 and controlling the operation of wheelchair lift 100 accordingly. Logic module 200 is connected to sensors which detect the positions of platform 111, upper arm 114, lower arm 115, inboard roll stop 126, inboard roll stop actuator 128, outboard roll stop 119 and threshold pressure plate 130, as well as whether restraint belt 127 is fastened. These sensors may include ammeters, voltmeters, limit switches, weight sensors, optical sensors, ultrasound sensors, pressure mats, pressure switches, pressure transducers, linear encoding devices such as variable resistors, and any other suitable sensors. Logic module 200 includes a microprocessor and software, and uses data from these sensors to control lift actuator 118 and inboard roll stop actuator 128. Logic module 200 may also detect pressure levels, voltage levels, faulty connections or other conditions that are relevant to the operation of lift components such as lift actuator 118 and inboard roll stop actuator 128.

FIG. 2A shows one embodiment of a control pendant 205 in accordance with the present invention. Control pendant 205 is connected to logic module 200, and includes a user interface comprising buttons 240, visual display 260 and keypad 270. While the various elements of the user interface are depicted as being located on control pendant 205, it should be understood that one or more of buttons 240, visual display 260 and keypad 270 may be located directly on logic module 200 or at any other location on wheelchair lift 100. It should further be understood that the number of buttons 240 and keys on keypad 270 are only exemplary, and any number of buttons or keys could be used.

As illustrated in FIG. 2A, control pendant 205 provides four functions which allow a user to operate wheelchair lift 100: UP, FOLD, UNFOLD, and DOWN. UP raises wheelchair lift 100 from the ground position to the floor level position. FOLD stows wheelchair lift 100 from the floor level position into the stowed position. UNFOLD unstows wheelchair lift 100 from the stowed position to the floor level position. DOWN lowers wheelchair lift from the floor level position to the ground position. Logic module 200 allows only the appropriate commands to be performed, depending on the position of wheelchair lift 100. For example, in the ground position, only the UP command is available. Below the floor level position, only the UP and DOWN commands are available. In the floor level position, only the DOWN and FOLD commands are available. In the stowed position, only the UNFOLD command is available. The available command choices for a given position may be indicated by the user interface, for example, by illuminated buttons 240. Logic module 200 may stop wheelchair lift 100 if more than one button is pressed at a time on control pendant 205.

Logic module 200 is capable of sending an interlock signal to the vehicle which is capable of interacting with the vehicle to prevent forward and rearward movement of the vehicle when wheelchair lift 100 is not in the stowed position. Logic module 200 is also capable of preventing unstowing and/or operation of wheelchair lift 100 unless an interlock signal is received from the vehicle, indicating, for example, that the vehicle transmission is in the park position and the vehicle parking brake has been set. Logic module 200 is also capable of stopping wheelchair lift 100 if: wheelchair lift 100 is overloaded, platform 111 is occupied when a FOLD command is received, resistance is encountered when wheelchair lift 100 is being stowed, outboard roll stop 119 is lowered when platform 111 is more than three inches above the ground, restraint belt 127 is not fastened, and threshold plate 130 is occupied when platform 111 is below the floor level position.

Logic module 200 raises and lowers inboard roll stop 126 at the appropriate points during operation of wheelchair lift 100. Before platform 111 is lowered from the floor level position, logic module 200 raises inboard roll stop 126. After platform 111 is raised to the floor level position, logic module lowers inboard roll stop 126. Logic module 200 will check the position of inboard roll stop 126 or inboard roll stop actuator 128 and raise inboard roll stop 126 if necessary before moving platform 111, regardless of the position of platform 111. This prevents inboard roll stop 126 from damaging the vehicle when inboard roll stop 126 is in a partially lowered position after repairs or any other reason while platform 111 is below the floor level position.

As shown in the embodiment illustrated by FIGS. 1B and 1C, outboard roll stop 119 may raise and lower without an actuator. In this case, logic module 200 may be connected to a separate ground sensor which indicates whether platform 111 is at or near ground level, such as by monitoring the position of outboard roll stop linkage 120, or by some other structure associated with platform 111 that is positioned to contact the ground. Logic module 200 is thus capable of stopping platform 111 if outboard roll stop 119 is lowered when platform 111 is greater than, for example, three inches from the ground. In another embodiment, logic module 200 may be programmed to stop further lowering either immediately or a predetermined time after the ground sensor indicates contact with the ground. This feature prevents platform 111 from coming to rest in a tilted or partially folded orientation when the end of platform 111 including the ground sensor contacts an uneven surface, such as a curb, before the other end of platform 111 has been fully lowered to the ground.

Logic module 200 is capable of preventing wheelchair lift 100 from being stowed when platform 111 is still occupied. As can be seen in FIG. 1D, roller 122 does not yet contact lower arm 115 in the floor level position. A small gap is present between roller 122 and lower arm 115 in the floor level position. When a FOLD command is received, this small gap allows platform 111 to remain substantially level during the initial phase of the stowing operation. During this initial phase of the stowing operation, platform 111 is lifted through a small distance of, for example, one or two inches. This small lifting motion allows logic module 200 to detect weight on platform 111. In one embodiment, logic module 200 detects whether a pressure switch coupled to lift actuator 118 is triggered during this small lifting motion. In another embodiment, logic module 200 detects the amperage required by lift actuator 118 to perform this small lifting motion. If the pressure switch is triggered or an out-of-range amperage is detected, logic module 200 will stop platform 111. The amount of weight on platform 111 necessary to prevent a stowing operation may be set, for example, to 50 pounds. Because of the small initial lifting motion, the position of a weight on platform 111 does not affect this interlock. After a stowing operation is stopped because of a weight on platform 111, logic module 200 may automatically return platform 111 to the floor level position, or require the user to push the DOWN button and return platform 111 to the floor level position. This maintains the small gap between roller 122 and lower arm 115, and prevents the user from overriding this interlock by pressing the FOLD button repeatedly.

Logic module 200 may also be capable of preventing wheelchair lift 100 from being stowed when platform 111 encounters resistance due to possible jamming of the lift apparatus. According to this embodiment, logic module 200 is programmed with a maximum pressure or amperage allowed for lift actuator 118 for stowing platform 111. When a FOLD command is received, logic module 200 may read the pressure or amperage on lift actuator 118 while platform 111 is rotated. If logic module 200 detects that the pressure or amperage required for lift actuator 118 increases a predetermined level beyond the maximum (e.g. an increase in pressure of 200 PSI), logic module 200 will stop platform 111 from rotating. Because the weight of platform 111 will be redistributed as it rotates, a higher pressure or amperage will be required when initiating the stowing operation than when finishing the stowing operation. Accordingly, maximum value for pressure or amperage required of lift actuator 118 may be programmed in logic module 200 as an adjustable curve.

In a further embodiment, logic module 200 is capable of preventing wheelchair lift 100 from lifting platform 111 from the ground to the floor level position when it is overloaded or encounters jamming resistance. As described above with respect to FIGS. 1B and 1C, logic module 200 may be connected to a ground sensor which indicates whether platform 111 is at or near ground level. When an UP command is received, lift actuator 118 begins to lift platform 111. Logic module 200 may then determine whether wheelchair lift 100 is overloaded by detecting if the pressure or amperage required for lift actuator 118 is above a maximum level. If so, logic module 200 will stop platform 111. To determine whether jamming resistance is encountered during lifting, logic module 200 may read the pressure or amperage on lift actuator 118 shortly (e.g. 1 second) after the ground switch comes out of contact with the ground. Thereafter, if logic module 200 detects that the pressure or amperage required for lift actuator 118 increases a predetermined level beyond the initial reading during lifting (e.g. an increase in pressure of 30 PSI), logic module 200 will stop platform 111. After a lifting operation is stopped because of overloading or jamming resistance on platform 111, logic module 200 may automatically return platform 111 to the ground level position, or require the user to push the DOWN button and return platform 111 to the ground level position.

According to another embodiment, logic module 200 is capable of stopping wheelchair lift 100 from raising or lowering platform 111 in response to the UP or DOWN commands when restraint belt 127 is not fastened. If restraint belt 127 becomes unfastened after raising and lowering operations have already commenced, logic module 200 may optionally be programmed to continue the operation and activate visual alarms 132 or an audio alarm until restraint belt 127 is refastened. In an alternative embodiment, logic module 200 may be programmed to stop wheelchair lift 100 from raising or lowering platform 111 only if it detects that platform 111 is occupied (e.g., the sensors indicate a weight of over 50 pounds is resting on platform 111).

The above described interlocks may be further optimized by programming logic module 200 to compensate for additional factors that may affect lift operations. Depending on atmospheric conditions or the age of the wheelchair lift 100, for example, the pressure or amperage required for lift actuator 118 to perform lifting and stowing operations may change over time. According to one embodiment, logic module 200 may adjust its maximum values by tracking changes in average pressure or amperage required to perform operations over time. The adjustment may be based on an average value for pressure or amperage of successful lift or stowing operations only, thereby eliminating any errors that might be introduced by failed operations. As another example, the initial pressure on lift actuator 118 when carrying out the stowing operation may vary depending on whether platform 111 arrived at the floor level position by being raised from the ground position or being unfolded from the stowed position. If platform 111 is unfolded and then refolded without raising and lowering, the pressure on lift 118 may be 30 to 40 PSI higher, for example. In order to compensate for this difference, logic module may be programmed to use a different maximum fold pressure based on the previous lift operation. Logic module 200 may also be programmed to compensate for other factors such as battery voltage level. When determining whether to prevent stowage because lift 100 is occupied, for example, a low battery voltage level may affect the sensor reading that determines whether the 50 pound weight limit is being exceeded. According to a further embodiment of the present invention, logic module may therefore take into consideration the battery voltage level when reading the weight sensed on platform 111.

FIG. 2B shows one embodiment of a hardware block diagram for a logic module 200 in accordance with the present invention. Logic module 200 includes a micro-controller 210 which receives commands 240 from the user through pendant 205. Micro-controller 210 also receives analog inputs 220 and switch inputs 230. Micro-controller 210 may be capable of communicating with another computer through an interface 212.

BATTERY VOLTS indicates the vehicle battery charge level. Logic module 200 may display a low battery indicator when the vehicle battery charge level is below, for example, 12.4 volts. Logic module 200 may also prevent wheelchair lift 100 from being unstowed or lowered when the vehicle battery charge level is below, for example, 12.2 volts. PRESSURE indicates the pressure from lift actuator 118 in an embodiment where lift actuator 118 is a hydraulic cylinder. BUS INTERLOCK is an indicator from the vehicle to logic module 200 that wheelchair lift 100 can be operated. For example, BUS INTERLOCK may indicate that the vehicle transmission is in the park setting and that the vehicle parking brake has been set. LIFT INTERLOCK is an indicator from logic module 200 to the vehicle that the vehicle can be operated. For example, LIFT INTERLOCK may indicate that wheelchair lift 100 is fully stowed.

STOW SWITCH indicates whether wheelchair lift 100 is in the fully stowed position. STOW SWITCH may be a sensor that detects the position of upper arm 114 and/or lower arm 115. LOWERING SWITCH indicates whether platform 111 is at or below the floor level position. LOWERING SWITCH may be a sensor that detects the position of upper arm 114 and/or lower arm 115. PRESSURE SWITCH indicates whether there is a weight on platform 111 before platform 111 can be stowed. PRESSURE SWITCH may be a pressure switch connected to lift actuator 118 and may be set, for example, to 50 pounds. OUTBOARD SWITCH indicates whether outboard roll stop 119 is raised. BELT SWITCH indicates whether restraint belt 127 has been fastened. FOLDING SWITCH indicates whether platform 111 is above the floor level position. MAT SWITCH indicates whether threshold plate 130 is occupied. GROUND SWITCH indicates whether wheelchair lift 100 is in the ground position. EXTRA SWITCH is reserved for other features or interlocks.

RAISE will raise platform 111. If lift actuator 118 is a hydraulic actuator, logic module 200 will turn on the pump motor for lift actuator 118. LOWER will lower platform 111. If lift actuator 118 is a hydraulic actuator, logic module 200 will open the hydraulic valve for lift actuator 118. FOLD will stow platform 111. If lift actuator 118 is a hydraulic actuator, logic module 200 will turn on the pump motor for lift actuator 118 in series with a resistor to provide a slower rate of motion. UNFOLD will unstow platform 111. If lift actuator 118 is a hydraulic actuator, logic module 200 will open the hydraulic valve for lift actuator 118. BEACON LIGHTS will turn on visual alarm 132 while wheelchair lift 100 is in operation. AUDIO BUZZER will turn on audio alarms while wheelchair lift 100 is in operation and/or if an interlock stops wheelchair lift 100. PLATFORM LIGHTS will turn on platform lights 134 while wheelchair lift 100 is at or below the floor level position. UNLATCH will unlatch hooks which hold wheelchair lift 100 in the stowed position. ACTUATOR+ will raise inboard roll stop 126, while ACTUATOR− will lower inboard roll stop 126.

When a command associated with buttons 240 is received from the user, micro-controller 210 first looks at the state of analog inputs 220 and switch inputs 230 to check that all conditions have been satisfied for the particular command. Only after all the proper conditions have been satisfied for the particular command, will micro-controller 210 send the proper output signals 250 to effect the command. For example, when an UP command is received from the user, micro-controller 210 will first check the inputs to see: (1) whether BUS INTERLOCK indicates that operate wheelchair lift 100 can be operated, (2) whether BATTERY VOLTS indicates there is sufficient battery voltage from the vehicle battery, (3) whether OUTBOARD SWITCH indicates that outboard roll stop 119 is raised when platform 111 is greater than, for example, three inches above the ground, (4) whether inboard roll stop 126 is raised by sending a signal to inboard roll stop actuator 128, (5) whether BELT SWITCH indicates that restraint belt 127 is fastened, and (6) whether MAT SWITCH indicates that threshold plate 130 is not occupied. Only after these conditions for an UP command are satisfied, will micro-controller 210 send the suitable signals that make up an UP command. For example, an UP command may include: (1) turning on BEACON LIGHTS, (2) turning on AUDIO BUZZER, (3) turning on PLATFORM LIGHTS, (4) sending a RAISE output to cause lift actuators 118 to raise platform 111 to the floor level position, (5) sending an ACTUATOR− output to lower inboard roll stop 126, and (6) turning off AUDIO BUZZER.

Logic module 200 may also be programmed to provide additional features which enhance the operation of wheelchair lift 100.

According to one embodiment of the present invention, logic module 200 may be programmed to adjust operation based on the types of sensors used to provide feedback for control of wheelchair lift 100. Sensors comprising pressure transducers, for example, may provide different levels of feedback to logic module 200 based on the scale (i.e. voltage output to pressure ratio) for the type of transducer used. Logic module 200 may be programmed to receive and store the scale value for a given transducer, and adjust operation as required. Scale value or other sensor variables may be entered into logic module 200 using keypad 270 of control pendant 205, or may be entered using other inputs such as by interface 212. Under this embodiment, different sensors may be incorporated into wheelchair lift 100 during the course of manufacturing and maintenance without affecting control of lift operation. It also enables logic module 200 to be recalibrated to compensate for changes in sensor feedback caused by normal wear and tear during the lifetime of a lift.

Where lift actuators 118 are hydraulic actuators, logic module 200 may be programmed to run the pump motors for lift actuators 118 for a small additional period of time after wheelchair lift 100 is fully stowed. This has the effect of pressurizing lift actuators 118 and minimizing or preventing rattling of wheelchair lift 100 in the stowed position. Logic module 200 may also be programmed to pressurize hydraulic actuators at certain time intervals or upon certain events to keep lift actuators 118 pressurized when wheelchair lift 100 is not being used. For example, logic module 200 may pressurize hydraulic actuators every time the vehicle is started, or use pressure sensor feedback to pressurize hydraulic actuators when the pressure has dropped below a certain value (e.g. below 900 PSI for lift actuators 118 when platform 111 is in the fully stowed position). According to one embodiment, it may be desirable to configure logic module 200 to pressurize hydraulic actuators only when the vehicle is on in order to avoid draining the vehicle battery.

Logic module 200 may be programmed to shut off wheelchair lift 100 if an out-of-range voltage is detected, thus acting as a programmable fuse to prevent damage to wheelchair lift 100.

Logic module 200 is capable of preventing wheelchair lift 100 from being operated when the vehicle battery charge level has dropped too low to prevent the vehicle battery from being drained to a point where the vehicle cannot start.

Logic module 200 is capable of recording the number of lift cycles and stow cycles. The definition of a lift cycle and a stow cycles may be changed as needed. For example, a lift cycle may be defined as one full trip from the ground position to the floor level position, regardless of how far platform 111 has actually traveled. Logic module 200 may also be capable of calculating the total amount of work performed by wheelchair lift 100, given the distance traveled by platform 111 and the weight carried.

As discussed above, logic module 200 includes a visual display 260 for displaying a variety information. Visual display 260 may be an LCD display or any other suitable display. Visual display 260 may assist the user in operation of wheelchair lift 100 by providing instructions, indicating the current command being performed, indicating the current status of wheelchair lift 100, highlighting conditions that must be satisfied before wheelchair lift 100 can be operated, and suggesting certain actions such as starting the engine to recharge the battery. Logic module 200 may be programmed to include options for the language in which to output instructions or command information to visual display 260, so that users may select between, for example, Spanish and English. In one embodiment of the present invention, information on visual display 260 may be accessed and responded to through the use of keypad 270.

Visual display 260 may assist in the maintenance of wheelchair lift 100 by displaying the number of lift cycles and stow cycles and suggesting maintenance to be performed. According to one embodiment of the present invention, microcontroller 210 may be programmed to output to visual display 260 alphanumeric codes that correspond to information such as number of cycles or total amount of work performed. The codes may then be used to evaluate requirements like scheduled maintenance or compliance with warranty requirements, without having to directly review data recorded in logic module 200. A single code may also be correlated to relate to multiple aspects of the lift operational history. In this manner, tracking and verification of lift status may be simplified. According to a further embodiment, a chart in the form of a decal, etc. may be attached to the lift to include information providing instructions relating to the alphanumeric codes, such as to call the lift vendor for assistance.

Visual display 260 may similarly assist in diagnostics and troubleshooting by, for example, indicating the vehicle battery charge level, indicating temperatures of motors or pumps, and displaying error messages. Visual display 260 may also be used during manufacturing, assembly, and maintenance of wheelchair lift 100 to aid in adjustment and calibration of the various components of wheelchair lift 100. For example, microcontroller 260 may be programmed to output to visual display 260 information about the above-described pressure, amperage and voltage compensation settings, as well as sensor information such as transducer scale.

Wheelchair lift 100 may include a battery backup system. The battery backup system allows wheelchair lift 100 to be operated when other sources of power are not available or have failed. The battery backup system exists in addition to a manual backup system, which may include a hand crank, hand pump, or other manually operated devices for operating wheelchair lift 100.

Lift actuator 118 may be a hydraulic actuator or an electrical actuator. Electrical actuators include screw drives, rack and pinion drives, and other actuators such as Electrak® ball bearing screw drives manufactured by Danaher Motion Linear Products, Marengo, Ill. The use of electrical actuators allow for variable speed control of the raising and lowering of wheelchair lift 100. Electrical actuators may reduce the number of external sensors needed to determine the position of wheelchair lift 100 by providing feedback from sensors such as integrated potentiometers or optical sensors. The electrical characteristics of electrical actuators may be used to implement interlocks. For example, an out-of-range voltage detected from electrical actuators while platform 111 is being lowered may indicate that an object is obstructing platform 111 from lowering, thus acting as an anti-crushing feature. An out-of-range voltage may also indicate that platform 111 has reached the ground, thus acting as an anti-jacking feature. As another example, an out-of-range voltage detected from electrical actuators while platform 111 is at floor level and while stowing of platform 111 is being attempted may indicate that platform 111 is still occupied, thus acting as an occupied platform interlock. Electrical actuators also allow for control of the wheelchair lift during lowering, instead of relying on the "gravity down" operation of hydraulic actuators. Electrical actuators may also allow wheelchair lift 100 to be held tightly in the stowed position without unstowing, rattling, or shaking. Electrical actuators also provide consistent performance over temperature changes and do not leak.

FIGS. 3A-3B show a prior art arm geometry for a wheelchair lift. The prior art geometry is a parallelogram design.

FIGS. 3C-3D show one embodiment of an arm geometry in accordance with the present invention. Upper arm 114 and lower arm 115 couple to frame 117 at two points that are farther apart than in the prior art geometry. In addition, the two points are located along a steeper angle than in the prior art geometry.

This lift arm geometry reduces the distance between the point where upper arm 114 couples to frame 117 and to the point where lower arm 115 couples to vertical arm 116 as the lift arms are passing through a horizontal position.

This lift arm geometry reduces the peak force needed from lift actuator 118. The reduced peak force required makes this lift arm geometry suitable for use with electrical actuators, which may not be able to generate as much force as hydraulic actuators of comparable cost. However, hydraulic actuators may still be used and benefit similarly from this lift arm geometry.

FIG. 3E shows a graph of actuator force required for the prior art arm geometry and an arm geometry in accordance with the present invention. As can be seen, the prior art arm geometry requires an actuator force of more than 2000 pounds when its platform has reached the floor level position. An arm geometry in accordance with the present invention requires an actuator force of less than 1200 pounds when its platform has reached the floor level position, with the maximum force during the lifting of the platform not exceeding 1300 pounds.

Although the above examples have described wheelchair lift 100 in the context of carrying a wheelchair and/or a passenger, wheelchair lift 100 may be used in other applications. Wheelchair lift 100 may be used in the same or modified form to be attached to different parts of a vehicle and to carry other types of payloads. Rather than having a mounting structure comprising a parallelogram design as illustrated, for example, wheelchair lift 100 may comprise another design such as a sliding assembly.

While the invention is described in terms of some specific examples and embodiments, it will be clear that this invention is not limited to these specific examples and embodiments and that many changes and modified embodiments will be obvious to those skilled in the art without departing from the true spirit and scope of the invention.

What is claimed is:

1. A method for operating a lift comprising the steps of:
providing a wheelchair platform connected to a vehicle and configured to move between a ground level position, a floor level position and a stowed position;
lifting the platform;
receiving a signal from a sensor associated with the lifting;
controlling operation of the lifting in response to a level of the signal received by the sensor, wherein said controlling prevents movement of the platform when the signal level reaches a set value; and
adjusting the set value from a first signal level to a second signal level based on additional platform position data about the lifting, wherein said set value is adjusted to the first signal level when moving the platform into the stowed position after moving the platform between the ground level position and the floor level position, and the set value is adjusted to the second signal level when moving the platform into the stowed position after moving the platform away from the stowed position.

2. The method of claim 1, further comprising selecting the set value based on a signal level detected within a selected time after moving a portion of the platform away from or into contact with a surface at the ground level position.

3. The method of claim 1, further comprising selecting the set value based on a curve corresponding to signal levels related to the movement of the platform at different points of a lift operation.

4. The method of claim 1, further comprising selecting the set value based on an amount of weight determined to be present on the platform.

5. The method of claim 1, further comprising:
detecting whether a restraint belt associated with the platform is fastened; and
preventing movement of the platform from between the ground level position and the floor level position if the set value is exceeded and the restraint belt is not fastened.

6. The method of claim 5, further comprising:
during a lift operation, stopping movement of the platform from between the ground level position and the floor level position if the signal level reaches the set value and the restraint belt is not fastened.

7. A method for operating a lift comprising the steps of:
providing a wheelchair platform connected to a vehicle and configured to move between a ground level position, a floor level position and a stowed position;
lifting the platform;
receiving a signal from a sensor associated with the lifting;
controlling operation of the lifting in response to a level of the signal received by the sensor, said controlling preventing movement of the platform when the signal level reaches a set value; and
adjusting the set value based on additional data about the lifting, wherein said adjusting the set value comprises tracking an average signal level associated with the lift operation and adjusting the set value based on changes to the average.

8. The method of claim 7, wherein tracking the average signal level does not include tracked signal levels produced by the sensor during failed lift operations.

9. The method of claim 7, further comprising selecting the set value based on a signal level detected within a selected time after moving a portion of the platform away from or into contact with a surface at the ground level position.

10. The method of claim 7, further comprising selecting the set value based on a curve corresponding to signal levels related to the movement of the platform at different points of a lift operation.

11. The method of claim 7, further comprising selecting the set value based on an amount of weight determined to be present on the platform.

12. The method of claim 7, further comprising:
detecting whether a restraint belt associated with the platform is fastened; and
preventing movement of the platform from between the ground level position and the floor level position if the set value is exceeded and the restraint belt is not fastened.

13. The method of claim 12, further comprising:
during a lift operation, stopping movement of the platform from between the ground level position and the floor level position if the signal level reaches the set value and the restraint belt is not fastened.

* * * * *